United States Patent [19]

Kodama et al.

[11] 4,170,273
[45] Oct. 9, 1979

[54] TRANSMISSION APPARATUS FOR FOUR-WHEEL DRIVE MOTOR VEHICLE

[75] Inventors: Masayuki Kodama, Tokyo; Toshio Takano, Hino; Sadao Makishima, Akikawa, all of Japan

[73] Assignee: Fuji Jukogyo Kabushiki Kaisha, Tokyo, Japan

[21] Appl. No.: 918,337

[22] Filed: Jun. 23, 1978

[51] Int. Cl.² .................... B60K 17/34; B60K 41/22
[52] U.S. Cl. ............................... 180/233; 74/473 R; 74/475; 180/70 R; 192/99 S
[58] Field of Search .............. 180/44 R, 49, 51, 52, 180/70 MS; 192/99 S; 74/740, 745, 665 F, 700, 360, 473 R, 475

[56] References Cited

U.S. PATENT DOCUMENTS

| | | | |
|---|---|---|---|
| 2,241,002 | 5/1941 | Peterson | 74/745 |
| 2,242,027 | 5/1941 | Fishburn | 74/475 |
| 2,821,868 | 2/1958 | Gregory | 74/745 |
| 3,106,851 | 10/1963 | Ivanchich | 74/475 |

*Primary Examiner*—Joseph F. Peters, Jr.
*Assistant Examiner*—R. Schrecengost
*Attorney, Agent, or Firm*—Martin A. Farber

[57] ABSTRACT

A transmission apparatus for four-wheel drive motor vehicle comprising a sub-transmission adapted to transmit power of the engine to a main transmission, means for transmitting the output of the main transmission to the front axle and to the rear axle, clutch device provided in the means for transmitting the output of the main transmission for selectively connecting or disconnecting the transmission of the output to either of the front or rear axle, a shift rod shifting the clutch mechanism in the sub-transmission, an actuating rod slidably provided in parallel with the shift rod, a shift lever connected to the actuating rod, and a shift fork slidably mounted on the actuating rod and engaged with the clutch device. There is provided with first engaging mechanism for causing the actuating rod and shift fork to come into fixed engagement relation to each other within a first moving range of the shift lever, and second engaging mechanism provided for causing the actuating rod and shift rod to come into fixed engagement relation to each other within a second moving range of the shift lever adjacent the first moving range, whereby the motor vehicle may be driven at an economical higher speed range and at a powerful lower speed range.

4 Claims, 8 Drawing Figures

TRANSMISSION APPARATUS FOR FOUR-WHEEL DRIVE MOTOR VEHICLE

BACKGROUND OF THE INVENTION

The present invention relates to a transmission apparatus for four-wheel drive motor vehicle.

In recent years, there has been provided a passenger car driven by four wheels and increased requirements for the passenger car which may be driven under various conditions. One of the requirements is that the car can be economically driven at a high speed and the other is that powerfully driven at a low speed. Further, it is desirable that the four-wheel drive car may also be driven by only front wheels or rear wheels in some cases.

To meet such requirements, a sub-transmission is provided to combine with the main transmission and clutch means for disconnecting the transmission of the power to either of the front or rear wheels, whereby the car may be driven in the wide transmission speed range and also driven by the front or rear wheels. However, the apparatus including the sub-transmission and the clutch means must be provided with a shift lever for manipulating the sub-transmission and another shift lever for manipulating the clutch means together with the shift lever for main transmission, namely there must be provided with three shift levers. This increases difficulties in manipulation of the transmissions and clutch means, which decreases in practicability of the car.

Therefore, it is object of the present invention to provide a transmission apparatus for four-wheels drive motor vehicle comprising a main transmission, a sub-transmission and clutch means for disconnecting the power to the front wheel or the rear wheel, and the sub-transmission and clutch means can be manipulated by one shift lever to change the transmission speed of the sub-transmission and to convert the four-wheel drive into the two-wheel drive in front or rear wheels.

SUMMARY OF THE INVENTION

In accordance with the present invention, the transmission apparatus comprises a first main drive shaft connected to the crankshaft of the engine through a clutch means, a sub-transmission provided adjacent to the first main drive shaft, a second main drive shaft provided adjacent the sub-transmission, a third main drive shaft provided in parallel with the second main drive shaft, a main transmission provided on the second and third main drive shafts, means for transmitting the output of the third main drive shaft to the front axle and to the rear axle, clutch device provided in the means for transmitting the output of the third main drive shaft for selectively connecting or disconnecting the transmission of the output to either of the front or rear axle, a shift rod axially slidably provided for shifting the clutch means in the sub-transmission, an actuating rod slidably provided in parallel with the shift rod, a shift lever connected to the actuating rod, and a shift fork slidably mounted on the actuating rod and engaged with the clutch device. In the present invention, there is provided first engaging means for causing the actuating rod and shift fork to come into the fixed engagement relationship to each other within a first moving range of the shift lever, and second engaging means provided for causing the actuating rod and shift rod to come into fixed engagement relationship to each other within a second moving range of the shift lever adjacent the first moving range.

These and other advantages of the invention will be more clearly understood from the following description taken together with the accompanying drawings.

DESCRIPTION OF THE PREFERRED EMBODIMENTS

Figure 1A:
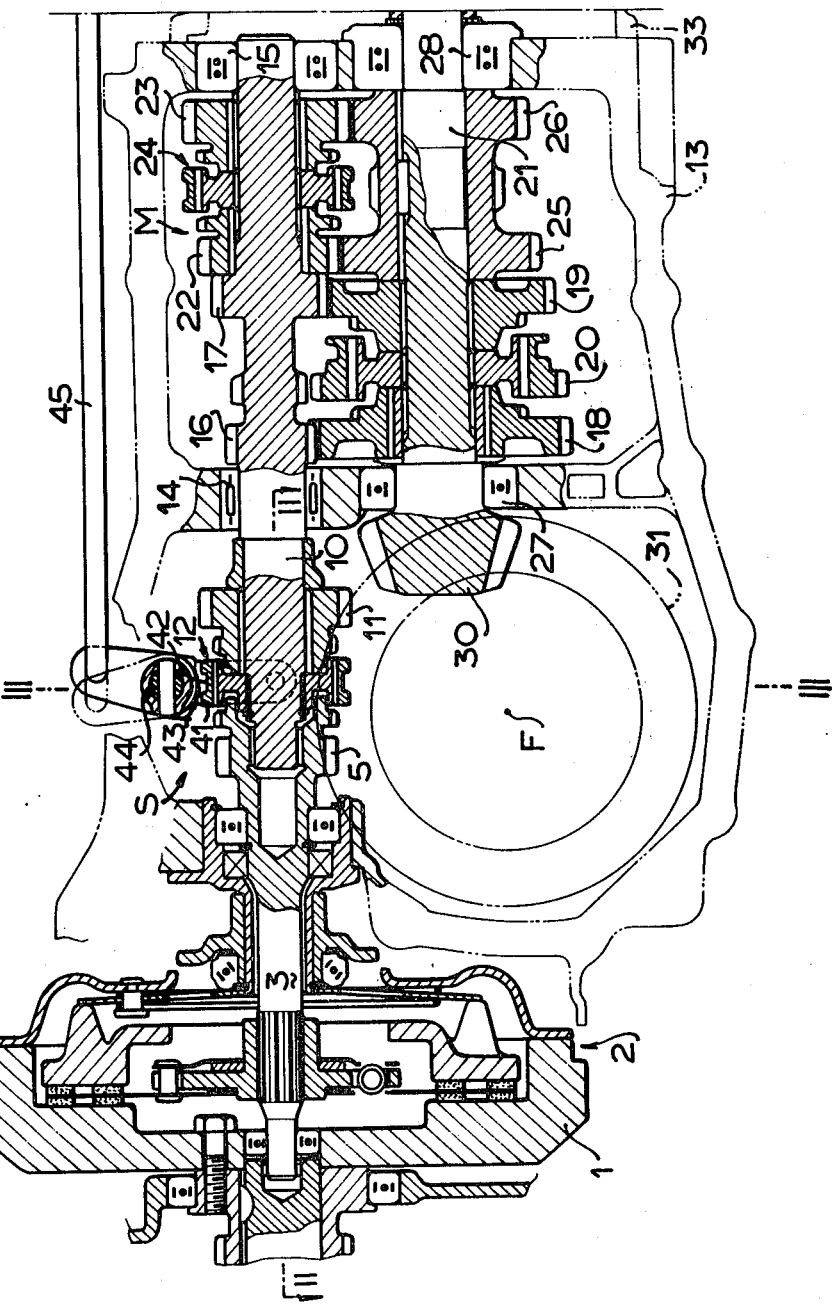
FIG. 1a is a sectional view showing a left half of an embodiment of the present invention.
Figure 2:
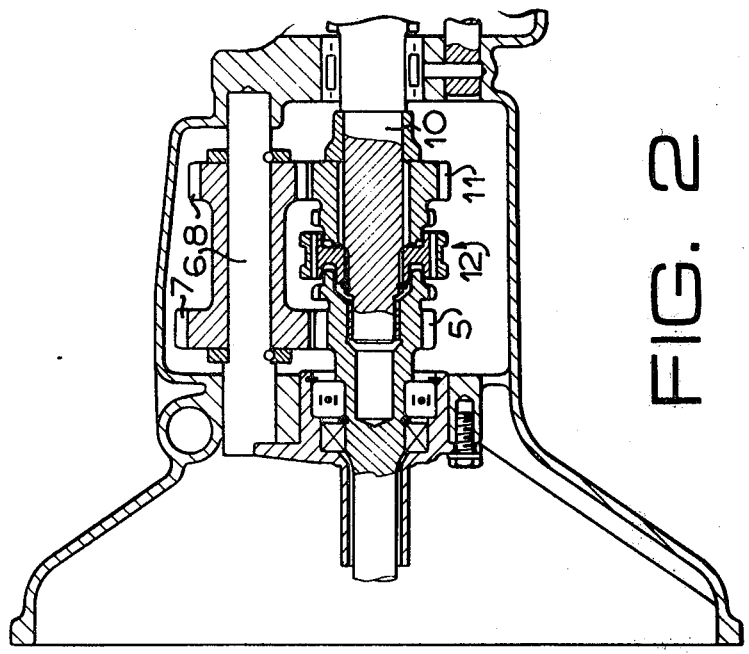
FIG. 2 is a sectional view taken along the line II—II in FIG. 1a, FIG. 3 is a sectional view taken along the line III—III in FIG. 1a, FIG. 4 is a sectional view taken along the line IV—IV in FIG. 1b.

Referring to the drawings, numeral 1 designates a flywheel secured to the end of crankshaft of the engine which is longitudinally disposed in the front portion of car. A first main drive shaft 3 in alignment with the crankshaft is rotatably supported and a clutch device 2 is provided on the first main drive shaft to engage with the flywheel 1. A 2-speed sub-transmission S is positioned above the front axle F and provided to transmit the power of the engine to a second main drive shaft 10. The sub-transmission S comprises a gear 5 formed on the first main drive shaft 3, counter gears 7 and 8 rotatably mounted on a counter shaft 6, a gear 11 rotatably mounted on the second main drive shaft 10, and an inertia lock type synchromesh mechanism 12 mounted on the second main drive shaft 10 with the spline. The gears 5 and 11 mesh with the gears 7 and 8 respectively.

The second main drive shaft 10 is in alignment with the first main drive shaft 3 and extended into a transmission case 13 of a 4-speed main transmission M and rotatably supported by bearings 14 and 15. The main transmission M comprises a lower 2-speed transmission device and a higher 2-speed transmission device. The lower 2-speed transmission device comprises gears 16 and 17 formed on the second main drive shaft 10, gears 18 and 19 rotatably mounted on a third main drive shaft 21 and engaged with the gears 16 and 17 respectively, and a lower speed stage synchromesh mechanism 20 splined on the shaft 21 between the gears 18 and 19. The higher 2-speed transmission device comprises gears 22 and 23 rotatably mounted on the second main drive shaft 10, a higher speed stage synchromesh mechanism 24 splined on the shaft 10 between the gears 22 and 23, gears 25 and 26 keyed on the third main drive shaft 21 and engaged with the gears 22 and 23 respectively. It should be noted that the back gear mechanism is not shown in the drawings.

The third main drive shaft 21 is rotatably supported by bearings 27 and 28 and provided with a hypoid pinion 30 formed at the front end thereof. The hypoid pinion 30 meshes with a ring gear 31 of a final reduction gear device mechanism. The final reduction gear device is positioned beneath the sub-transmission S in the space between the clutch device 2 and the main transmission M, and adapted to transmit the output of the third main drive shaft 21 to the front wheel through the front axle F. The rear end of the third main drive shaft 21 extends out of the transmission case 13, on which a gear 37 is fixed with a spline engagement.

On the rear end of the transmission case 13 is provided a housing 33 in which a rear wheel drive shaft 34 is rotatably supported by bearings 35 and 36. On the rear wheel drive shaft 34 is rotatably mounted a gear 38 which engages the gear 37. A rear wheel drive synchromesh mechanism 40 is mounted on the rear wheel drive shaft with spline. The rear wheel drive shaft 34 is connected to a rear axle through a propeller shaft (not shown).

Figure 5:
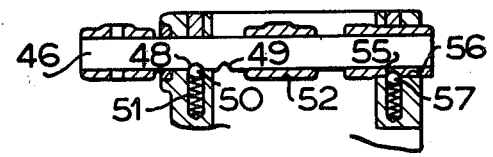
FIG. 5 is a sectional view taken along the line V—V in FIG. 4, FIGS. 6a to 6c are illustrations for showing the operation of manipulating device.

Device for manipulating the clutch means in the sub-transmission S and for coupling the third main drive shaft 21 to the rear wheel drive shaft 34 will be described hereinafter. A shift fork 43 is rotatably supported by a shaft 44, and opposite ends of the fork are slidably engaged with a circumferential groove 42 of a sleeve 41 which is a part of the synchromesh mechanism 12 as well known mechanism. The lever of the shift fork 43 is pivotally connected to a link 45 of which rear end is connected to a shift rod 46 through a connecting member 47. The shift rod 46 is slidably supported in the housing 33, and provided with a pair of notches 48 and 49 as shown in FIG. 5. With one of the notches, a lock ball 50 is engaged by means of a spring 51 so that the shift rod 46 may be locked at the notches 48 or 49. On the shift rod 46, an arm 52 is fixedly provided by means of a pin 53 and a shift fork 54 is slidably mounted at base portion 54a thereof. The shift fork 54 engages a circumferential groove 59 of a sleeve 58 of the synchromesh mechanism 40 so as to shift the sleeve along the shaft 34. The base portion 54a is provided with a pair of notches 55 and 56 and a spring loaded lock ball 57 engages with one of the notches to lock the shift fork at the notch 55 or 56.

Figure 6:
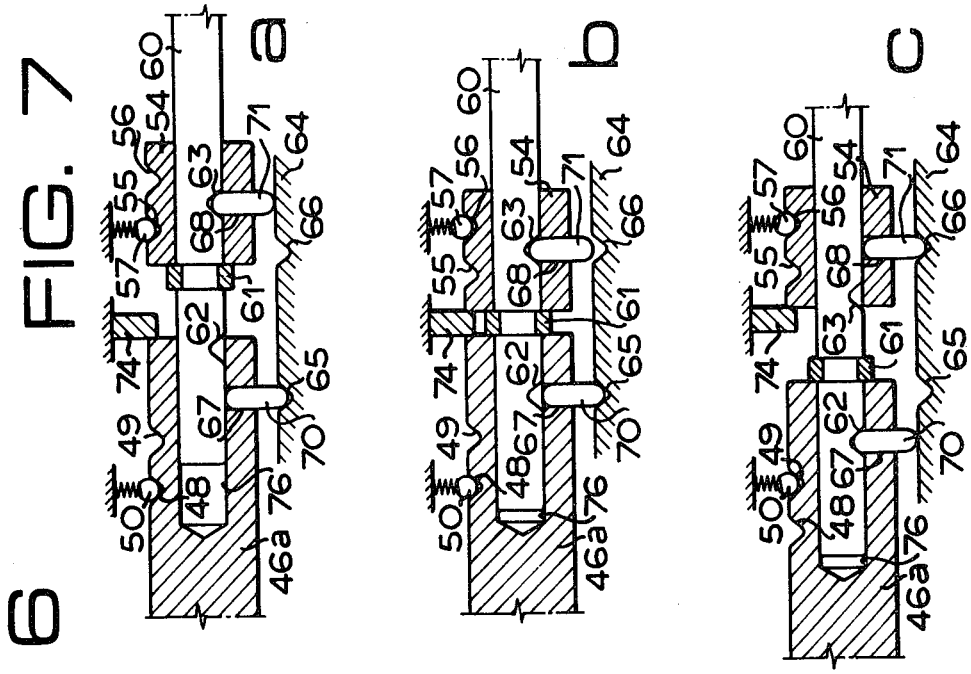

An actuating rod 60 is slidably supported in the housing 33 at a position adjacent and parallel to the shift rod 46, the arm 52 and shift fork 54 being slidably mounted thereon. The actuating rod 60 is provided with a snap ring 61 (FIG. 6) and notches 62 and 63. On the guide plate 64 secured to the cover 33, a pair of notches 65 and 66 are provided opposite the notches 62 and 63. In the arm 52 and the fork 54 are provided holes 67 and 68 which correspond to the notches 62 and 63 respectively. The holes 67 and 68 receive slidable pins 70 and 71 each of which has a length sufficient to engage corresponding one notch. On the rear end of the actuating rod 60 is connected a shift lever 72 which is pivoted by a pin 72 on the bracket 75 secured to the housing 33.

Figure 1B:
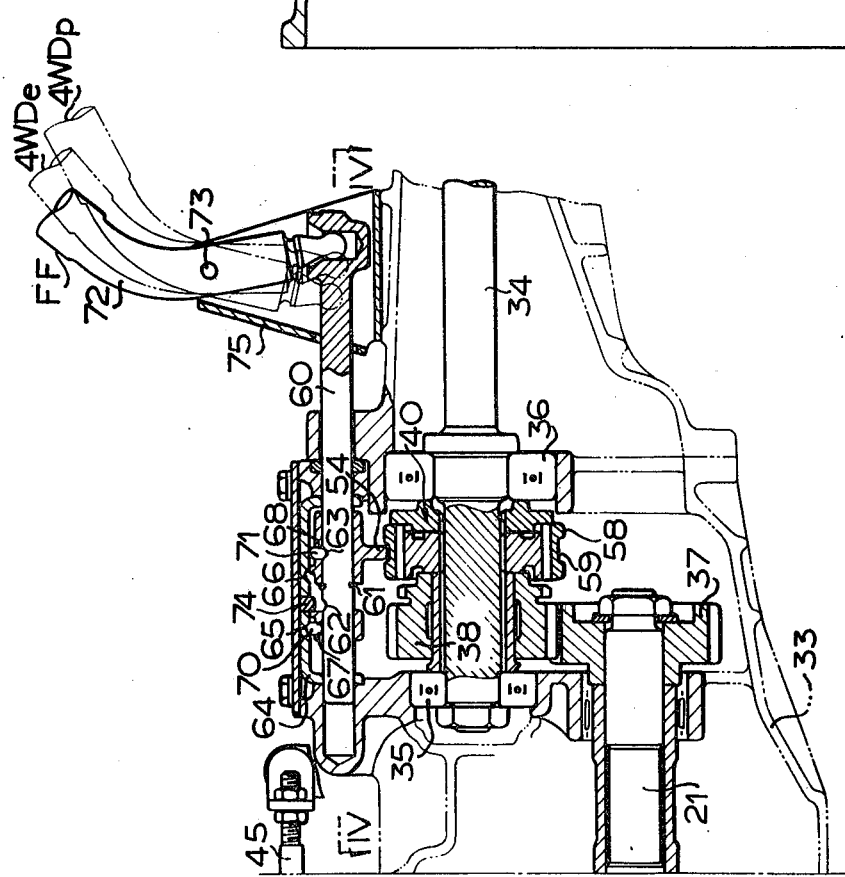
FIG. 1b is a sectional view showing a right half of the embodiment.
Figure 3:
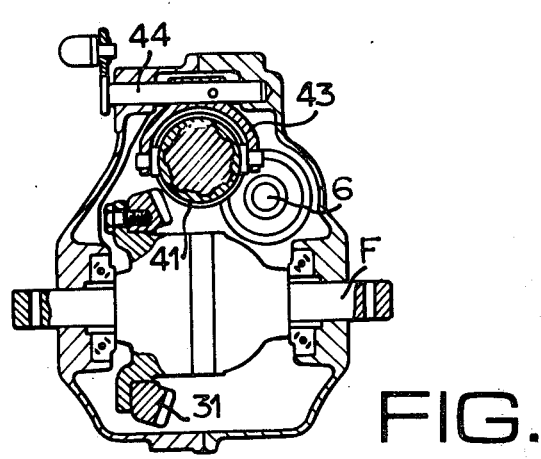
Figure 4:
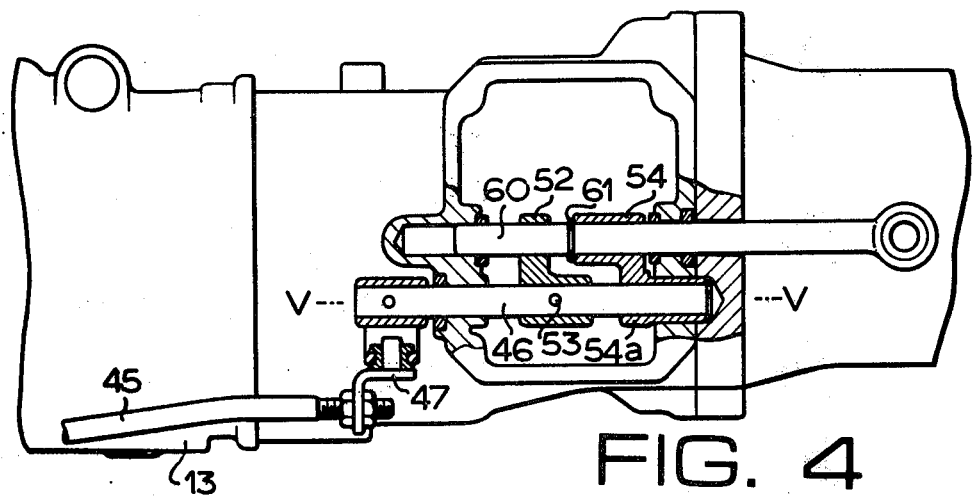

FIG. 6a shows front wheel driving position of the shifting mechanism comprising the shift rod 46, arm 52, shift fork 54 and actuating rod 60, where the shift lever 72 is in the front wheel driving position FF in FIG. 1b. The actuating rod 60 is in the right extreme end position, whereby the shift fork 54 is located in the right position by the snap ring 61, where the pin 71 engages the notch 63 of the actuating rod 60 and the lock ball 57 engages the notch 55 of the shift fork 54. In this position, the sleeve 58 of the synchromesh mechanism 40 is in the right position, so that the clutch device of the mechanism does not engage the gear 38. The arm 52 and shift rod 46 are also in the right position, in which the arm abuts on the stopper 74 projected from the guide plate 64 and the lock ball 50 engages the notch 48.

In this position, the link 45 is in the right position, so that the shift fork 43 is actuated to shift the sleeve 41 of the synchromesh 12 of the sub-transmission S in the left direction to couple the clutch device between the gear 5 and the synchromesh 12.

Thus, power of the engine is transmitted through the clutch device 2, first main drive shaft 3, gear 5 and sleeve 41 of synchromesh mechanism 12 to the second main drive shaft 10 without reduction by the sub-transmission S. The main transmission M transmits the rotation of second main drive shaft 10 to the third main drive shaft 21 by means of 4-speed transmission gear means. More particularly, if the synchromesh mechanism 20 is actuated by manipulating a shift lever (not shown) to couple the clutch device between the synchromesh mechanism and the gear 18, the third main drive shaft 21 is rotated at the lowest first speed. If the clutch device between the synchromesh mechanism and the gear 19 is engaged, the drive shaft 21 rotates at second speed. Further, engagement of the clutch device between the synchromesh mechanism 24 and the gear 22 will produce the third speed of the drive shaft 21, and engagement of the clutch device between the synchromesh mechanism and the gear 23 causes the fourth speed rotation of the drive shaft 21. The output of the drive shaft 21 is transmitted to the front axle through the gears 30 and 31 to drive the front wheel. On the other hand, since the synchromesh mechanism 40 is not in engagement position with the gear 38, the rear wheel is not driven. Thus, only front wheel is driven in the higher speed range without reduction of the sub-transmission S.

When the shift lever 72 is moved to the economical four-wheel driving position (4WDe) in FIG. 1b, the actuating rod 60 is shifted in the left direction up to the intermediate position. Since the pin 71 engages the notch 63 of the actuating rod 60, the shift fork 54 is also shifted in the left direction together with the rod 60. When the shift fork 54 reaches the position of FIG. 6b, the fork is stopped by the stopper 74, where the pin 71 positions opposite the notch 66 of the guide plate 64 and the lock ball 57 engages the notch 56, resulting in the locking of the fork 54. Thus, only the shift fork 54 is moved, so that the sleeve 58 of the synchromesh mechanism 40 is shifted in the left direction to engage the gear 38. Accordingly, the shaft 34 is rotated through the third main drive shaft 21, gears 37 and 38 and sleeve 58. Since the shift rod 46 is not moved, the sub-transmission S is in the higher speed coupling stage. Thus, the front and rear wheels are driven at higher speed range without reduction of the sub-transmission S.

When the shift lever 72 is moved to the powerful four-wheel driving position (4WDp), the actuating rod 60 is shifted to the left extreme end position. In this operation, the fork 54 stays in the described position, the pin 71 is moved by the slant of the notch 63 to engage the notch 66. The arm 52 is moved by the snap ring 61 whereby the pin 70 is shifted by slant of the notch 65, resulting in removing from the notch 65 and engaging the notch 62 as shown in FIG. 6c. Thus, the shift rod 46 is moved together with the arm 52 and locked by engagement of the lock ball 50 with the notch 49 at the left end position. The movement of the shift rod 46 causes counter-clockwise rotation of the shift fork 43 through the link 45 thereby to move the sleeve 41 of the synchromesh mechanism 12 to bring about the engagement between the synchromesh mechanism and the gear 11. Therefore, the rotation of the first main drive shaft 3 is transmitted to the second main drive shaft 10 with the reduction by the gears 5, 7, 8, and 11. Thus, the front and rear wheels are driven at the lower speed range.

Figure 7:
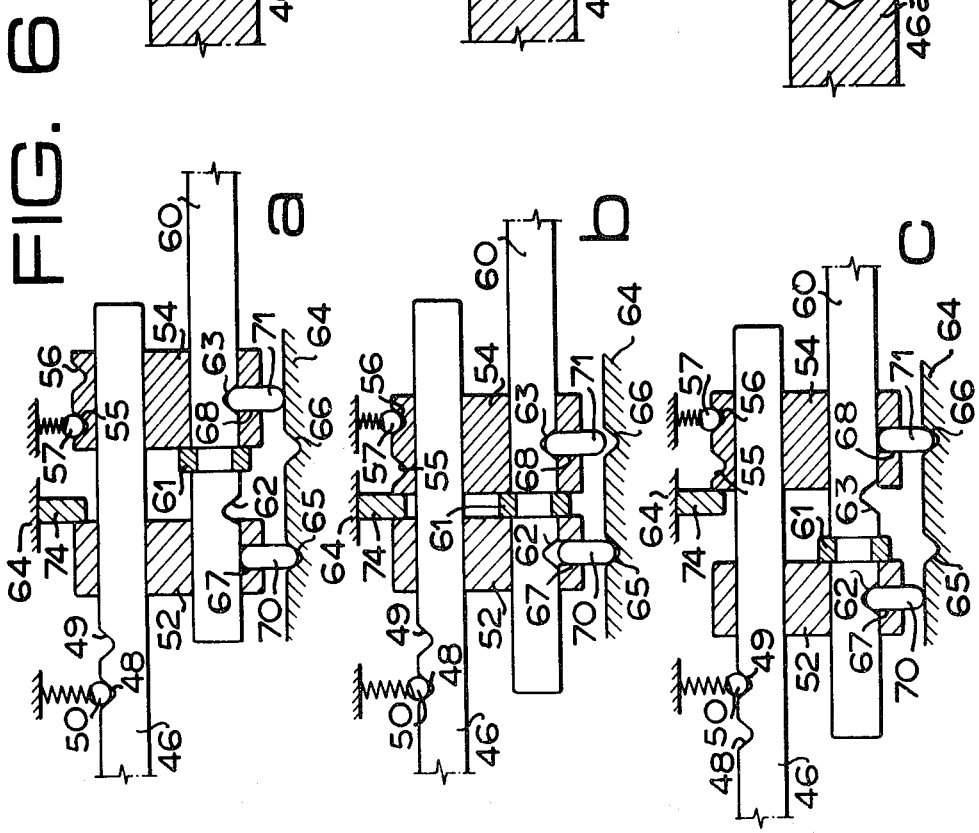
FIGS. 7a to 7c are illustrations for showing the operation of manipulating device of another embodiment.

In the embodiment of FIG. 7, the arm 52 and the shift rod 46 in the above mentioned embodiment are constructed into one shift rod 46a and the arm being omitted. The shift rod 46a is aligned with the actuating rod 60 which is slidably engaged with an axial hole 76 of the shift rod. The other parts are same as the prior embodiment in construction and operation and therefore, designated by same numerals as prior one. Operation of this embodiment will be easily understood from FIGS. 7a to 7c which are corresponding to FIGS. 6a to 6c.

In the above mentioned embodiment, although the front wheels are main drive wheels and the rear wheels are sub-drive wheels, it is possible to modulate the rear wheels to the main drive wheels and the front wheels to the sub-drive one.

What is claimed is:

1. A transmission apparatus for four-wheel drive motor vehicle comprising a first main drive shaft connected to the crankshaft of the engine through a clutch means, a sub-transmission provided adjacent to said first main drive shaft, a second main drive shaft provided adjacent said sub-transmission, said sub-transmission including reduction gear trains and a clutch means manually operable to select the transmitting speeds for transmitting the output of said first main drive shaft to said second main drive shaft, a third main drive shaft provided in parallel with said second main drive shaft, a main transmission provided on said second and third main drive shafts, means for transmitting the output of said third main drive shaft to the front axle and to the rear axle, clutch device provided in said means for transmitting the output of said third main drive shaft for selectively connecting or disconnecting the transmission of the output to either of the front or rear axle, a shift rod axially slidably provided for shifting said clutch means in said sub-transmission, an actuating rod slidably provided in parallel with said shift rod, a shift lever connected to said actuating rod, a shift fork slidably mounted in said actuating rod and engaged with said clutch device, first engaging means provided for causing said actuating rod and shift fork to come into fixed engagement relationship to each other within a first moving range of said shift lever, thereby to shift the shift fork by manipulating said shift lever, second engaging means provided for causing said actuating rod and shift rod to come into fixed engagement relation to each other within a second moving range of said shift lever adjacent said first moving range thereby to shift said shift rod, and means for positioning said shift rod and actuating rod at the respective stroke ends.

2. A transmission apparatus in accordance with claim 1 in which said second engaging means includes an arm secured to said shift rod and slidably mounted on said actuating rod.

3. A transmission apparatus in accordance with claim 1 in which said actuating rod is slidably engaged with a hole axially provided in said shift rod.

4. A transmission apparatus in accordance with claim 1 in which each of said first and second engaging means comprises a pin radially slidably provided to achieve said fixed engagement relation, and notches each of which having slants for retracting said pin by axial movement of said actuating rod.

* * * * *